United States Patent
Nolan et al.

(10) Patent No.: US 7,642,743 B1
(45) Date of Patent: Jan. 5, 2010

(54) CHARGER FOR REMOTE BATTERY

(75) Inventors: Matthew Thomas Nolan, Sherwood, OR (US); Carl Ray Smith, Boring, OR (US)

(73) Assignee: Cooper Technologies Company, Houston, TX (US)

( * ) Notice: Subject to any disclaimer, the term of this patent is extended or adjusted under 35 U.S.C. 154(b) by 348 days.

(21) Appl. No.: 11/312,944

(22) Filed: Dec. 19, 2005

(51) Int. Cl.
  *H02J 7/00* (2006.01)
  *H02M 5/27* (2006.01)
  *H01M 10/44* (2006.01)
  *G08B 21/00* (2006.01)
  *G05F 1/00* (2006.01)

(52) U.S. Cl. .................. 320/107; 320/108; 320/109; 429/52; 323/222; 340/431; 363/10

(58) Field of Classification Search ........... 320/107, 320/108, 109; 323/222; 363/15
  See application file for complete search history.

(56) References Cited

U.S. PATENT DOCUMENTS

| | | | |
|---|---|---|---|
| 6,254,201 B1 * | 7/2001 | Lesesky et al. ......... | 303/122.02 |
| 6,320,358 B2 * | 11/2001 | Miller ................. | 323/222 |
| 7,286,046 B2 | 10/2007 | Kinsey et al. | |
| 7,498,687 B2 | 3/2009 | Kinsey et al. | |
| 2004/0071004 A1 * | 4/2004 | King ................... | 363/142 |
| 2004/0184289 A1 * | 9/2004 | Vinciarelli ............ | 363/15 |

OTHER PUBLICATIONS

Sure Power Inc., 11020C00 Specification Outline, Jan. 25, 2005, 7 Pages.

* cited by examiner

*Primary Examiner*—Edward Tso
*Assistant Examiner*—Yalkew Fantu
(74) *Attorney, Agent, or Firm*—Armstrong Teasdale LLP

(57) ABSTRACT

A remote battery charger, comprising a DC-to-DC converter, able to accept a first DC current with a voltage of less than 13 VDC and able to produce, from said first DC current, a second DC current of at least a 15 amps at a voltage of at least 13.5 VDC, provided an adequate first DC current level. Also, the charger includes a current acceptance reduction input, whereby when said input is activated said DC-to-DC converter reduces its acceptance of said first DC current.

23 Claims, 1 Drawing Sheet

CHARGER FOR REMOTE BATTERY

BACKGROUND OF THE INVENTION

All trucks manufactured for the U.S. market must have a number of safety features that require electricity. In addition, many trucks include a "lift gate." This is an electric powered gate at the back of the truck or trailer that is used to lift cargo from ground level to the level of the truck or trailer's cargo bay and vice versa. A battery or set of batteries is required to power this gate and is electrically connected to the truck batteries located at the truck engine. Due to the long distance, typically about 15 meters (50 feet) from the truck batteries to the remote batteries, it is difficult in some circumstances to keep an adequate charge in the remote batteries. This is particularly true when it is cold and the lift gate must be used a large number of times. More voltage is required to push current into a cold battery and the constant draining of the battery may soon lead to a condition in which the lift gate no longer operates, greatly complicating the task of the delivery personnel.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a remote battery charger, comprising a DC-to-DC converter, able to accept a first DC current with a voltage of less than 13 VDC and able to produce, from the first DC current, a second DC current of at least a 15 amps at a voltage of at least 13.5 VDC, provided an adequate first DC current level. Also, the charger includes a current acceptance reduction input, whereby when the input is activated the DC-to-DC converter reduces its acceptance of the first DC current.

In a second separate aspect, the present invention may take the form of a remote battery charger assembly adapted for use in a truck having ABS braking, a brake light wire and a cargo bay interior lighting assembly powered by a cargo bay lighting wire. The assembly includes a DC-to-DC converter, able to accept an input DC current at a first voltage and supply an output DC current at a second voltage different than the first voltage. Also, an input DC current acceptance interrupt assembly accepts as inputs the brake light wire and the cargo bay interior lighting wire and reducing the current acceptance of the DC-to-DC converter when any criterion of a set of criteria is met for its inputs.

In a third separate aspect, the present invention may take the form of a method for operating a remote battery charger assembly adapted for use in a truck having ABS braking and a brake light wire and a cargo bay interior lighting assembly powered by a cargo bay interior lighting wire. The method includes, providing and permitting to operate a remote power charger assembly, including a DC-to-DC converter, able to accept an input DC current at a first voltage and supply an output DC current at a second voltage different than the first voltage. Also, the brake light wire is monitored and the cargo bay interior lighting wire and reducing the current acceptance of the DC-to-DC converter when a set of criteria is met for the brake light wire and the cargo bay interior lighting wire.

In a fourth separate aspect, the present invention may take the form of means for providing an elevated voltage level for charging a remote battery in a truck having both interior lighting means and antilock braking system (ABS) means, each of which has an on state and an off state. Included is a DC-to-DC converter means, able to accept an input DC current at a first voltage and supply an output DC current at a second voltage different than the first voltage. Also, an input DC current acceptance reduction means accepts as inputs the brake light means and the cargo bay lighting means and reducing the current acceptance of the DC-to-DC converter when any criterion of a set of criteria is met for its inputs.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF THE PREFERRED EMBODIMENT(S)

Figure 1:
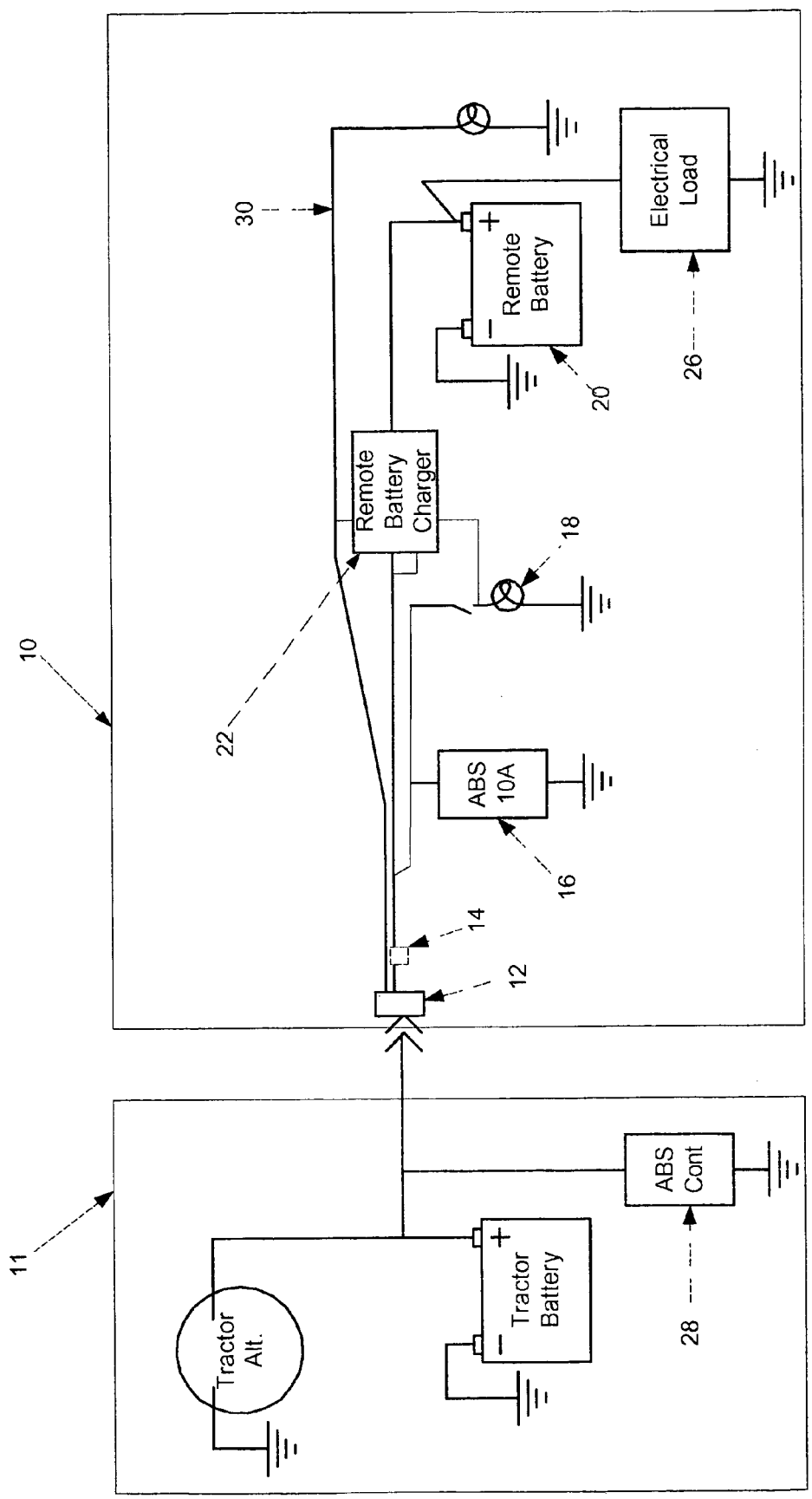
FIG. 1 is a schematic diagram of a portion of the electrical system for a trailer having a remote electrical load.

Referring to FIG. 1, in a trailer electrical system 10 designed to operate as a subsystem of a tractor trailer rig, power from the tractor electrical system 11 is connected by way of an SAE J560 7-way connector 12. On one line from connector 12 is a "slow blow" 40 Amp circuit breaker 14, an antilock braking system 16, interior lights 18, a remote battery 20, a remote battery charger 22 and a remote variable electrical load 23. The load 23 may be a lift gate, a heater, a starter or motor, a satellite tracking device or some other auxiliary device that must be located at a distance from the truck or tractor engine.

A "slow-blow" circuit breaker is one which will open for a current slightly above its maximum current only if that slightly higher current is maintained for a period of time. For a current that is markedly higher, for example ten times the stated circuit breaker maximum, the circuit breaker opens immediately.

Charger 22 is designed to accept a DC input at any level down to 9 VDC so that an ample current can be maintained from the truck engine battery bank. The input current is transformed to create an output current having desired characteristics. In one preferred embodiment the output current is delivered at 14 VDC and may flow at a rate of 20 AMPS. Any one of a number of different switching converter topologies can be used to achieve the voltage boost of charger 22. These include the buck/boost converter topology and the push/pull converter topology, both of which are well known to skilled persons.

The fact that at colder temperatures a higher voltage is required to help a battery accept a charge motivates an alternative preferred embodiment. In this embodiment, the remote charger 22 is equipped with a temperature sensing device, such as a thermister, and the output voltage is set as a function of temperature, with a lower temperature resulting in a higher output voltage.

One requirement of the remote battery charger is that it not interfere with the operation of the anti-lock braking system (ABS) 16. This could happen in one of two ways. First, the communication of ABS 16 with a tractor ABS system 28 could be attenuated by elements in the remote charger 22.

Alternatively, in an unlikely scenario, the current draw of the remote charger 14 when added to that of the ABS 16 and/or interior lights 18 could make the task of ensuring a proper supply of voltage to the ABS more difficult. Although the interior lights 18 would typically not be on when the truck was in motion, they are sometimes left on inadvertently after a delivery.

To avoid the problem of an attenuation of the ABS communication signals, the input to remote charger 22 includes an inductor, which acts as a low pass filter and thereby prevents the relatively high frequency ABS communication signals from being absorbed by the capacitance of charger 22. This permits the ABS communication signals to be left substantially unaffected by the presence of charger 22, thereby preserving the communications between the trailer system ABS 16 and the tractor ABS 28. This filter is included in the remote charger 22, greatly easing the task of installation over previous systems in which a filter had to be installed separately on the input line to charger 22.

To avoid circuit breaker 14 switching to open state, the brake light line 30 and the interior light line 32 are connected as inputs to remote charger 22, which includes circuitry that translates these signals to the appropriate voltage range, buffers them, and feeds them as inputs to a microprocessor (not shown) that controls charger 22. In one preferred embodiment, charger 22 is turned "off" if either the brake light 30 is on or the interior lights 18 are on. In another preferred embodiment charger 22 is turned "off" if the brake light line 30 is on, but its current draw is merely restricted (to less than 20 Amps, for example) when the interior lights 18 are on, to provide a margin of safety for ensuring adequate voltage to the ABS 16. In yet another embodiment the charger 22 automatically turns off only when both brake light line 30 and the interior light 18 are on, but restricts its own current input if only one of these inputs is on.

While a number of exemplary aspects and embodiments have been discussed above, those of skill in the art will recognize certain modifications, permutations, additions and sub-combinations thereof. For example, although the system has been described as it would exist in a tractor-trailer rig, delivery trucks having a cargo bay that is rigidly affixed to the cab also are frequently equipped with lift gates, or some other remote electrical load. In this embodiment, there would be no SAE J560 connector, but most other aspects of the embodiment would be the same. It is therefore intended that the following appended claims and claims hereafter introduced are interpreted to include all such modifications, permutations, additions and sub-combinations as are within their true spirit and scope.

The invention claimed is:

1. A remote battery charger, comprising:
   (a) a DC-to-DC converter, able to accept a first DC current with a voltage of less than 13 VDC and able to produce, from said first DC current, a second DC current of at least 15 amps at a voltage of at least 13.5 VDC, provided an adequate first DC current level; and
   (b) a current acceptance reduction signal input, whereby when said input is activated by a signal at said signal input said DC-to-DC converter reduces its acceptance of said first current.

2. The remote battery charger of claim 1, wherein when said DC-to-DC converter reduces its acceptance of said first current, it reduces its acceptance of said first current down to a substantially zero current level.

3. A remote battery charger assembly adapted for use in a truck having ABS braking and a brake light wire and a cargo bay interior lighting assembly powered by a cargo bay lighting wire, comprising:
   (a) a DC-to-DC converter, able to accept an input DC current at a first voltage and supply an output DC current at a second voltage, the second voltage being different from and higher than said first voltage; and
   (b) an input DC current acceptance reduction assembly, accepting as inputs said brake light wire and said cargo bay interior lighting wire and reducing said current acceptance of said DC-to-DC converter when any criterion of a set of criteria is met for its inputs.

4. The remote battery charger assembly of claim 3, wherein when said DC-to-DC converter reduces its acceptance of said first current, it reduces its acceptance of said first current down to a substantially zero current level.

5. The assembly of claim 3, wherein said set of criteria includes only one member criterion.

6. The assembly of claim 3, wherein said set of criteria is user selectable.

7. The assembly of claim 6, wherein said set of criteria is user selectable by way of a set of two position manually adjustable elements that remain in place between instances of adjustment.

8. The assembly of claim 3, wherein said set of criteria includes the criterion that the cargo bay lighting wire is carrying significant electric current.

9. The assembly of claim 8, wherein said assembly responds to satisfaction of said criterion by reducing current input into said DC-to-DC converter to a level less than some positive DC current level.

10. The assembly of claim 3, wherein said set of criteria includes the criterion that the brake light wire is carrying significant electrical current.

11. The assembly of claim 10, wherein satisfaction of said criteria results in a reduction to a substantially zero level of said DC-to-DC converter input level.

12. A method for operating a remote battery charger assembly adapted for use in a truck having ABS braking and a brake light wire and a cargo bay interior lighting assembly powered by a cargo bay interior lighting wire, comprising:
   (a) providing and permitting to operate a remote power charger assembly, including a DC-to-DC converter, able to accept an input DC current at a first voltage and supply an output DC current at a second voltage, the second voltage being different from and higher than said first voltage; and
   (b) monitoring said brake light wire and said cargo bay interior lighting wire and reducing said current acceptance of said DC-to-DC converter when a set of criteria is met for said brake light wire and said cargo bay interior lighting wire.

13. The method of claim 12, wherein when said DC-to-DC converter reduces said acceptance of current, it reduces said acceptance of current down to a substantially zero current level.

14. Means for providing an elevated voltage level for charging a remote battery in a truck having both interior lighting means and ABS means, each of which has an on state and an off state, comprising:
   (a) DC-to-DC converter means, able to accept an input DC current at a first voltage and supply an output DC current at a second voltage elevated from said first voltage;
   (b) input DC current acceptance reduction means, accepting as inputs said brake light means and said cargo bay lighting means and reducing said current acceptance of said DC-to-DC converter when any criterion of a set of criteria is met for its inputs.

15. The means of claim 14, wherein when said input DC current acceptance reduction means reduces said current acceptance of said DC-to-DC converter, it reduces said current acceptance down to a substantially zero current level.

16. A remote battery charger for a tractor-trailer, comprising:
    a DC-to-DC converter, comprising
        a current input configured to receive a first DC current from a current source at a first voltage;
        an output configured to deliver a second DC current to a first load, wherein the second DC current is converted from the first DC current at the first voltage to a second current at a second voltage, the second voltage being higher than the first voltage; and
        a signal input configured to determine the presence of a signal at the signal input, the signal indicating that a load coupled to the first DC current exceeds a threshold,
    wherein, in response to determining that a signal is present on the signal input, reducing the first DC current received by the current input.

17. The remote battery charger of claim 16, wherein reducing the first DC current comprises reducing the first DC current to zero.

18. The remote battery charger of claim 16, wherein the signal indicates that one of the cabin lights and the antilock braking system is activated.

19. The remote battery charger of claim 16, wherein the threshold is based on a voltage rating of a fuse coupled to the current source.

20. The remote battery charger of claim 16, wherein the threshold is exceeded when a current draw from the load renders available current from the current source insufficient to power an antilock braking system.

21. The remote battery charger of claim 16, wherein the current source comprises a main battery for the tractor trailer.

22. The remote battery charger of claim 16, wherein the first load comprises at least one of a lift gate and a lift gate battery.

23. The remote battery charger of claim 22, wherein the first load is disposed in a trailer of the tractor-trailer.

* * * * *

UNITED STATES PATENT AND TRADEMARK OFFICE
CERTIFICATE OF CORRECTION

PATENT NO.        : 7,642,743 B1                                   Page 1 of 1
APPLICATION NO.   : 11/312944
DATED             : January 5, 2010
INVENTOR(S)       : Nolan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 81 days.

Signed and Sealed this

Sixteenth Day of November, 2010

David J. Kappos
*Director of the United States Patent and Trademark Office*